July 19, 1960 F. S. MALICK 2,946,000

MAGNETIC AMPLIFIERS

Filed May 13, 1955

INVENTOR.
FRANKLIN S. MALICK
BY G. D. O'Brien
F. L. Styner ATTYS.

United States Patent Office 2,946,000

Patented July 19, 1960

2,946,000

MAGNETIC AMPLIFIERS

Franklin S. Malick, Milwaukee, Wis., assignor, by mesne assignments, to the United States of America as represented by the Secretary of the Navy Filed May 13, 1955, Ser. No. 508,330

2 Claims. (Cl. 323—89)

Figure 1:
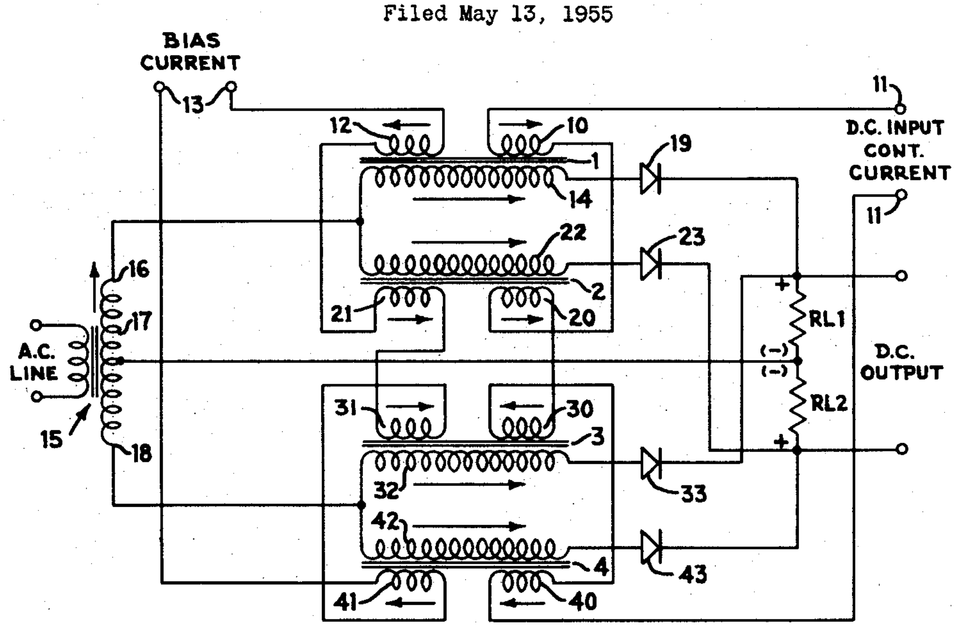

This invention relates to magnetic amplifiers and is particularly directed to circuit improvements for reducing the size of saturable reactors for amplifiers of a given output capacity.

Fundamentally, in an embodiment of the subject invention, the aforestated economy in size is attributable to the utilization of parallel or split power windings in the saturable reactors of the balanced amplifier. As a result, each leg of the amplifier, in effect, will be comprised of two saturable reactors. The A.-C. power input is connected to a terminal common to the two power windings of the reactors comprising each branch. The A.-C. output of each power winding is translated by a rectifier into a direct current and these currents are then applied to opposite ends of a center-tapped load element. In a similar manner the other branch of the balanced amplifier also is connected between the A.-C. power input and the aforesaid common load element. A single control circuit for direct-current control potentials of both polarities includes windings to produce oppositely polarized magnetic fields in the two saturable reactors of each branch. The A.-C. power supply comprises an input transformer having a center-tapped secondary winding. The respective center-taps of the secondary winding and the aforementioned load element are directly connected. As a result, it is unnecessary to double the direct current input signal in order to produce a given effect on the direct current output. It should be understood, therefore, that the full effect of a control potential is developed across the common load resistor. It is this feature which makes it possible to minimize the size of an amplifier constructed in accordance with the subject invention.

According to an important modification of the subject invention, a single regulatory winding incorporating dual bias and control functions is provided for each saturable reactor. In general, this regulatory circuit includes means to receive a bipolar input signal comprising, for example, a dual triode having an adjustable common cathode resistor. The regulatory windings are connected in series between the plates of the triode. Like the aforementioned control windings, the regulatory windings of the saturable reactors of each branch of the balanced amplifier are connected to produce oppositely polarized magnetic fields. A source of direct current bias voltage is applied to the regulatory circuit at a terminal located between the regulatory windings of each branch. It should be noticed that in this circuit arrangement the source of direct current bias also constitutes the source of anode voltage for the dual triode.

Heretofore, it has been common in bridge-type magnetic amplifiers for direct current amplification of both positive and negative control voltages and where full wave rectification was desired for both positive and negative control voltage, to connect the output load resistor in series between a center tap on the alternating current supply winding and th diametrically opposite point of the bridge. A magnetic amplifier of this type is shown in "Magnetic-Amplifier Circuits" by Geyger, McGraw-Hill 1954, page 200. With this type of circuit it was necessary to wind the reactors for operation at twice the desired direct current output voltage, thus unnecessarily increasing the size of the reactors. Further, the failure of the bias supply caused the two ends of the transformer secondary to be connected together through the low resistance of the rectifiers. This sometimes caused overheating thereby damaging the rectifiers, reactors and the transformer. A protective relay was required to safeguard against such overloading.

The object of this invention is a bridge-type magnetic amplifier for direct current amplification of both positive and negative control voltages where full wave rectification is desired for both positive and negative control voltages.

A further object of this invention is circuit improvements for reducing the size of the components in the full wave positive-negative magnetic amplifier.

Another and important object of the invention is to provide a simplified regulatory circuit for the saturable reactors which insures a substantial increase in the sensitivity of the amplifier and fulfills the functional requirements of direct-current control and biasing.

Figure 2:
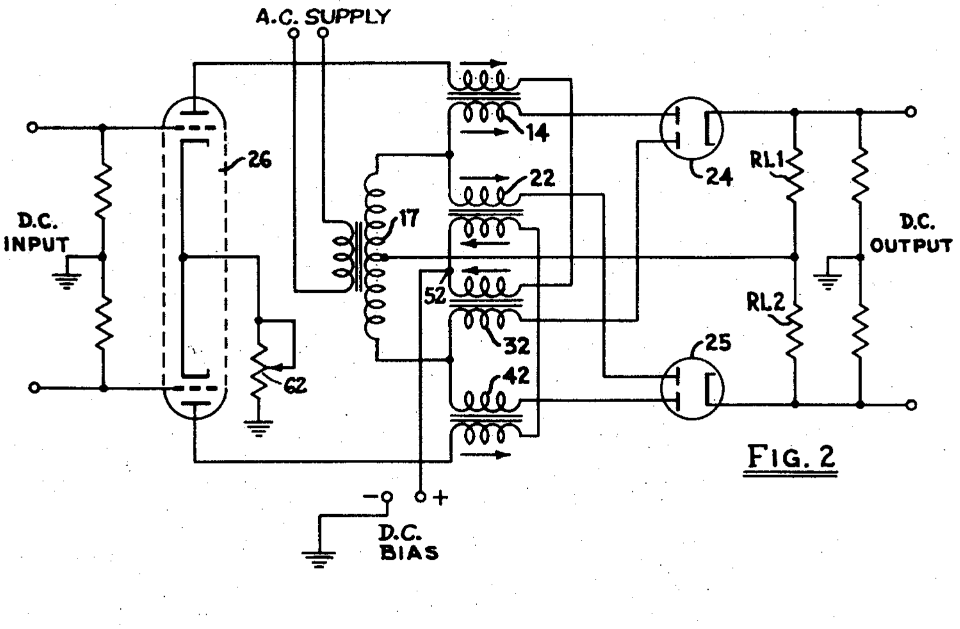

Other objects and features of this invention will become apparent by referring to the specific embodiments described in the following specification and shown in the accompanying drawings in which:

Fig. 1 is a wiring diagram of one magnetic amplifier embodying this invention, and Fig. 2 is a modification of the diagram shown in Fig. 1.

Referring first to Fig. 1, four saturable reactor cores, 1, 2, 3, 4, are each wound with three windings. On core 1, for example, winding 10 is connected to the direct current control voltage applied at terminals 11, winding 12 is connected to an adjustable direct current biasing source connected to terminals 13, and winding 14 is wound to conduct the alternating current supplied by power transformer 15. The control windings 10, 20, 30, and 40 are connected in series across terminals 11. Each of the bias windings 12, 21, 31 and 41 are connected in series across the terminals 13 of the biast source. Alternating current power windings 14 and 22 are connected in parallel between one terminal 16 of the secondary 17 of the power transformer 15 on the one hand and opposite ends of the load resistors RL–1 and RL–2 on the other hand. Power windings 32 and 42 are likewise connected in parallel between the other terminal 18 of the power transformer secondary winding and opposite ends of the load resistors RL–1 and RL–2. Rectifiers 19, 23, 33 and 43 are, respectively, connected between one end of the reactor power windings and the terminals of the load resistors. It is to be noted that the rectifiers are all polarized in the same direction with respect to the connected ends of their series power windings. According to an important feature of this invention the mid-point of the transformer secondary is connected directly to the mid-point of the load resistors RL–1 and RL–2.

The control windings 10 and 20 are connected in series and their polarization reversed one with respect to the other so that as the control voltage at 11 changes, the magnetization produced in core 1 is opposite to the change in magnetization produced by winding 20 at its core 2. Thus, the impedance of the main windings 14 and 22 may selectively be made high by reversal of control voltage at terminals 11. Likewise, the polarization of windings 30 and 40 are reversed so that the impedance of main windings 32 and 42 may be differentially controlled by the control voltage at 11.

With the proper bias current supplied at terminals 13, the impedance of each power winding 14, 22, 32 and 42 may be made very high. This impedance can be made to drop with increasing control current until the impedance is equal to the ohmic resistance of the windings. When the impedance is high the entire applied alternating current appears across the power winding, hence the winding must have sufficient number of turns so that the core does not saturate at the peak voltage. In Fig. 1 it is seen that the maximum voltage which could appear across the main winding or across the load resistance is the voltage between the center tap and one end of the transformer secondary. With the bias current alone flowing, all the voltage is across the power windings and none across either load resistor RL–1 or RL–2. Now, when the control current flows in one direction a full wave rectified direct current voltage proportional to this current appears across load resistor RL–1. Since the voltage across RL–2 is zero, the direct current output voltage at the terminals is the same as the voltage across RL–1. When the direction of the control current is reversed, the polarity of the direct current output reverses and is produced by the drop through RL–2.

The rectifiers may be either of the solid state or vacuum types. A practical application of the circuits of this invention to vacuum tube rectifiers is shown in Figs. 2. Here it is found convenient to combine the control-winding functions and the bias-winding functions in one winding. The other windings 14, 22, 32 and 42, on the cores correspond in function to the power windings 14, 22, 32, and 42, respectively, of Fig. 1. It now becomes convenient to connect power windings 14 and 32 to the anodes of the dual-element rectifier tube 24. Likewise, main windings 22 and 42 are connected to the anodes of the second dual-element rectifier 25. The common cathodes of the rectifiers are respectively connected to opposite ends of the load resistance RL–1 and RL–2. The centerpoint of the load resistance is connected to the mid-point of the secondary 17 of the alternating current power transformer as in Fig. 1. In Fig. 2, as in Fig. 1, it is seen that the maximum voltage which can appear across the main winding or across the load resistance is the voltage between the center tap and one end of the secondary 17. When the bias current alone is flowing all the voltage is across either load resistor RL–1 or RL–2. The direct current voltage applied to the control terminals 11 appears in amplified form at the direct current output terminals and with a polarity determined by the polarity at the control terminals.

A useful refinement in the control circuit is shown in Fig. 2. To increase the sensitivity of the magnetic amplifier to small magnitudes of direct current control signal, a double triode 26 is connected in the control circuit. The anode-cathode circuit of one triode is connected in series with one pair of control or regulatory windings and the anode-cathode of the other triode is connected in series with the other pair of control or regulatory windings. Terminal 52, located on the conductor interconnecting the two control or regulatory windings, constitutes the input for a direct current bias voltage. It should be noticed, of course, that the direct current voltage applied to terminal 52 also constitutes the anode voltage for the dual triode 26. To facilitate adjustment of the magnitude of the bias current, a potentiometer 62 constitutes a common cathode resistor for the dual triode.

It should be apparent that the regulatory control circuit, as described in the preceding paragraph, not only insures extreme sensitivity to small direct-current control voltages but also provides a simple and economical unit featuring dual control and bias functions. It should be understood, of course, that solid-state current-flow control elements may be substituted for dual triode 26, and that solid-state rectifiers may be substituted for rectifiers 24 and 25.

With the magnetic circuits of this invention, full direct current output voltage may be derived without increasing either the size of the reactor or their windings to prevent the overheating common in amplifiers of this type. No longer can the transformer secondary be short circuited through the low forward resistance of rectifiers and low impedance windings. Many modifications may be made in the invention defined in the appended claims without departing from the spirit thereof.

What is claimed is:

1. A magnetic amplifier for amplifying a direct-current of either polarity comprising: a power supply having a center-tapped secondary winding, said secondary winding provided with two connecting leads; a center-tapped load element; means electrically coupling the center taps of said secondary winding and said local element; a first and a second pair of saturable reactors, each of said pair of saturable reactors having power windings and two regulatory windings; means electrically coupling the power windings of said first pair of saturable reactors to one of said two connecting leads of the secondary winding, and means electrically coupling the power windings of said second pair of saturable reactors to the other of said two connecting leads; means electrically coupling the power windings of each of said pairs of saturable reactors in series with the load element; a dual triode tube, said triode tube having its grids coupled across a control voltage source, one triode having its anode coupled in series through one of the two regulatory windings of each pair of saturable reactors in reversed current relation to each other to provide a first reversed current pair of regulatory windings, and the other triode having its anode coupled in series with the other of the two regulatory windings of each pair of reactors in reversed current relation to each other to provide a second reversed current pair of regulatory windings, said first and second reversed current pairs of regulatory windings on said first and second pairs of saturable reactors being connected together at a juncture, the juncture of said first and said second reversed current pairs of regulatory windings being coupled to a direct-current biasing voltage providing a biasing current producing oppositely-polarized magnetic fields in each of said first and said second reversed current pairs of regulatory windings as well as in each pair of saturable reactors and providing anode potential for said dual triode; and an unbypassed variable impedance in a common coupling of the cathodes of said dual triode tube to a constant potential level for providing a self-biasing potential variable to control the magnitude of said biasing current through said first and second reversed current pairs of regulatory windings to said direct-current biasing voltage whereby the regulatory and biasing characteristics of the magnetic amplifier is controllable for alternating power currents.

2. In a balanced magnetic amplifier including two pairs of saturable reactors each pair having power windings and two regulatory windings, a bipolar, direct-current, reactor-saturation control circuit comprising: a dual triode tube, said triode tube having its grids coupled across a control voltage source and said triode tube having one anode thereof connected in series with one of the two regulatory windings of each pair of reactors in reversed current relation to each other to provide a first reversed current pair of regulatory windings, and having another anode connected in series with the other of the two regulatory windings of each pair of reactors in reversed current relation to each other to provide a second reversed current pair of regulatory windings, and said first and second reversed current pairs of regulatory windings being connected together at a juncture to provide direct current saturable reactor current control in each pair of saturable reactors although the current flow in the power windings thereof change polarity; means impressing a direct-current biasing voltage on said series coupling between said triode tube anodes at said juncture providing a biasing current through said first and second reversed current pairs of regulatory windings and an anode voltage for said dual triode tube; and an unbypassed variable resistance in a common coupling of the dual triode tube cathodes to a fixed level potential providing a self-biasing potential adjustable to control the magnitude of said biasing current through the regulatory windings whereby the magnetic amplifier is highly sensitive to regulatory and biasing currents.

References Cited in the file of this patent

UNITED STATES PATENTS 2,657,281 Kluz ---------------- Oct. 27, 1953

2,677,099 Rau ---------------- Apr. 27, 1954
2,704,823 Storm ---------------- Mar. 22, 1955
2,770,770 Lufcy ---------------- Nov. 13, 1956
2,855,560 Sanders ---------------- Oct. 7, 1958

OTHER REFERENCES

Geyger: "Magnetic Amplifier Circuits," McGraw-Hill Book Co., 1954 (Fig. 5.11, pages 71 and 72, particularly the last full paragraph on page 72).